United States Patent [19]

Wollscheid et al.

[11] Patent Number: 4,853,891
[45] Date of Patent: Aug. 1, 1989

[54] MEMORY-PROGRAMMABLE CONTROLLER

[75] Inventors: Dieter Wollscheid, Erlangen; Peter Ninnemann, Rottenbach; Siegfried Stoll, Wilhermsdorf; Waldemar Wenzel, Erlangen, all of Fed. Rep. of Germany

[73] Assignee: Siemens Aktiengesellschaft, Berlin & Munich, Fed. Rep. of Germany

[21] Appl. No.: 568,115

[22] Filed: Jan. 4, 1984

[30] Foreign Application Priority Data

Jan. 28, 1983 [DE] Fed. Rep. of Germany ....... 3302909

[51] Int. Cl.[4] .......................................... G06F 12/00
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,422,401 | 1/1969 | Lucking | 364/200 |
| 3,921,146 | 11/1975 | Danco | 340/172.5 |
| 3,942,158 | 3/1976 | Dummermuth | 340/172.5 |
| 4,058,850 | 11/1977 | Sheikh | 364/900 |
| 4,064,395 | 12/1977 | Schubeler et al. | 364/900 |

Primary Examiner—David Y. Eng
Attorney, Agent, or Firm—Kenyon & Kenyon

[57] ABSTRACT

A memory-programmable controller is disclosed having a bit and word processor for controlling a peripheral process. A process control program is stored in a user program memory. The controller includes a data memory in which process images of the controlled process are stored. A supplemental memory is coupled in parallel with the data memory. Bit-wide data is stored in the data memory and change bits associated with individual ones of the bit wide data in the data memory are stored in the supplemental memory. The change bits determine whether the associated bit in the data memory can be changed during processing by the control program. Definite control states can thereby be simulated for test purposes.

1 Claim, 2 Drawing Sheets

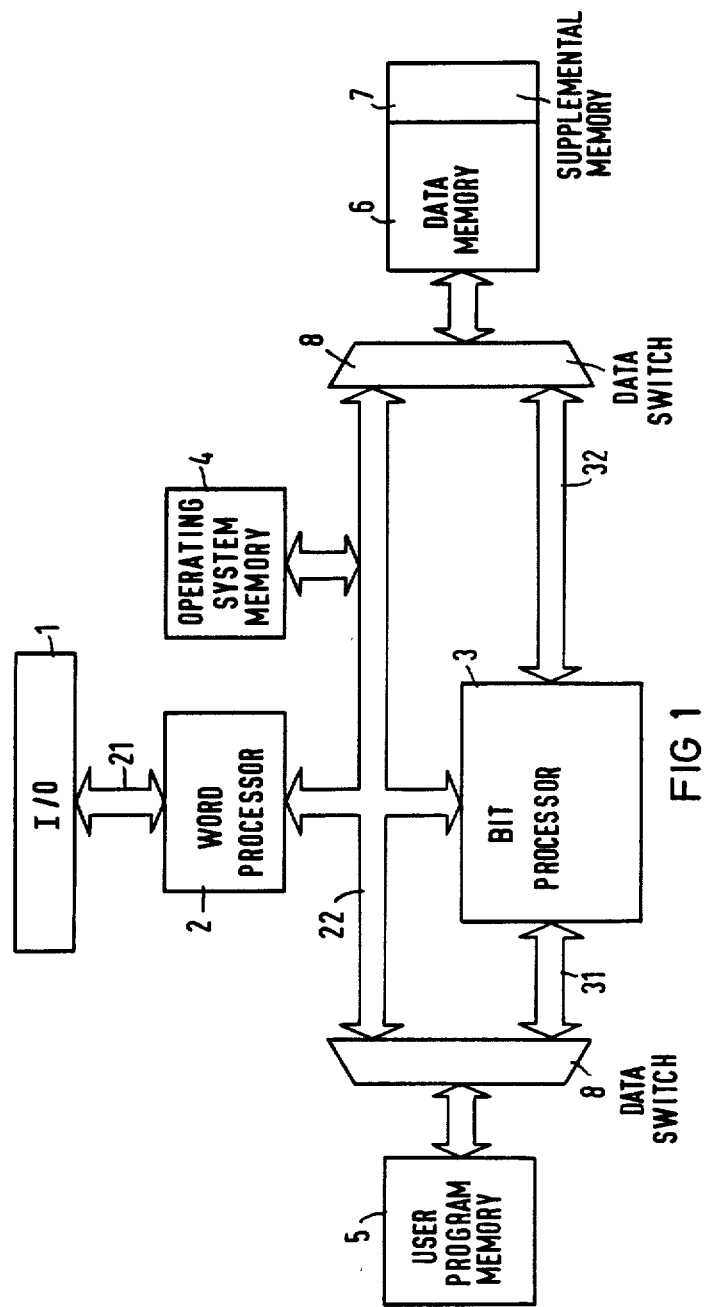

MEMORY-PROGRAMMABLE CONTROLLER

CROSS REFERENCE TO RELATED APPLICATIONS

This application is related to the following U.S. patent applications, each of which was filed on even date herewith and assigned to the assignee of the present application:

MEMORY-PROGRAMMABLE CONTROLLER, filed as Ser. No. 568,107 on Jan. 4, 1984 in the name of Dieter Wollscheid, and claiming priority of German Application No. P33 23 824.3 filed July 1, 1983;

MEMORY-PROGRAMMABLE CONTROLLER, filed as Ser. No. 568,104 on Jan. 4, 1984 in the names of Peter Ninnemann and Dieter Wollscheid, and claiming priority of German Application No. P33 02 902.4 filed Jan. 28, 1983;

MEMORY-PROGRAMMABLE CONTROLLER, filed as Ser. No. 568,106 on Jan. 4, 1984 in the names of Peter Ninnemann and Dieter Wollscheid, and claiming priority of German Application No. P33 02 929.6 filed Jan. 28, 1983;

MEMORY-PROGRAMMABLE CONTROLLER WITH WORD AND BIT PROCESSORS, filed as Ser. No. 568,105 on Jan. 4, 1984 in the names of Peter Ninnemann and Dieter Wollscheid, and claiming priority of German Application No. P3 02 940.2 filed Jan. 28, 1983.

The disclosures of each of the above applications is hereby incorporated by reference.

BACKGROUND OF THE INVENTION

The present invention relates to the field of memory-programmable controllers of the type having cyclically traversed user control programs for controlling peripheral processes. In particular, the present invention relates to memory programmable conotrollers of the type including a processor for executing commands from the control program and from an operating system program, a user program memory wherein the control program is stored, an operating system memory wherein the operating system program is stored, and a data memory wherein process images of the process under control are stored in the form of a bit-wide data.

Memory-programmable controllers of the type mentioned above are described, for instance, in European Pat. No. 10170 and U.S. Pats. Nos. 3,921,146 and 3,942,158. Further details may also be found in the journal Siemens Energietechnik 1979, No. 2, pages 43 to 47, or No. 4, pages 136 to 139.

In these memory programmable controllers, the process signals are processed by appropriately designed microprocessor systems. It is characteristic of these controllers that they do not directly process the actual signals of the peripheral process being controlled, but rather process the internal binding process images stored in a data memory. See, for instance, European Pat. No. 10170 and U.S. Pat. Nos. 3,921,146 and 3,942,158.

In controllers of this type, a user-control program is stored in a user accessible program memory and directs the course of the process under control. The user control program includes both word commands, i.e., commands directed to the processing of words, and, binary interlinking commands, which are directed to performing the logical interlinking operations on the process images stored in a data memory. Before the actual interlinking according to the user control program is made, the state of all input information from the controlled process is first always stored in the internal data memory. Likewise, the output signals obtained from the interlinking are not read out to control the process directly but are first also stored in the internal data memory. All output signals are then read out at the end of the control program from the internal data memory to control the process.

It is achieved by this method that during the operation of the actual control program, the input data to be processed always have defined, fixed values, and no intermediate values of the output data are passed on to the peripheral process being controlled.

The purpose of the sytem is therefore to read in the process images of the inputs, to execute the control program and to read out the process images of the outputs. In the control program itself, the process signals are interlinked with the process images and, depending on the input and output signals and the programming, output signals, i.e., the signals controlling the process, are formed.

Since every signal from and to the process can electrically assume two states (current flows or does not flow), a bit in the process image with the states 0 and 1 corresponds to each signal of the controlled process. In the control program itself, single bits of the process image are therefore handled by the processor according to the control problem in the process to be automated. The user can adapt the system at any time to changing control problems by a corresponding change of the control program.

In the course of steady further development and in the growing spectrum of applications of microprocessor technology, these memory-programmable controllers are also increasingly used at the lower levels of automation and process signal technology, in which contactor type controllers played a dominant role heretofore. The user of contactor type controllers is accustomed to simulating, or "fixing" temporarily certain process signals for testing purposes without general changes of the control program, i.e., in this case the wiring of the contactors and without intervention into the process itself, for instance, in order to obtain information regarding the behavior of the controller or the process changed thereby.

The so-called "forcing" or "fixing" of process signals in this manner to a fixed value, as is done with contactor type controllers, should also be possible in memory-programmable controllers of the type mentioned above. The fixing or forcing of an input signal from the controlled process, or of an output signal to the process to a closely determined state, should therefore also take place entirely independently of the true state of the input signal in the process itself or of the output signal.

Since output signals as well as input signals are interlinked further, provision must also be made that in further interlinking of output signals, the fixed state is used and not the state which would have resulted, for instance, from prior interlinking.

It should therefore be possible to simulate certain input and output signals of the controller without intervention into the process itself, or to simulate certain output signals for the process itself. These signals must not be changeable by the control program nor by the process. At the same time, the input or output signals which are not fixed must be processed normally as before and it should also be possible to interlink them logically with the fixed input or output signals.

The possibility is thereby provided to the user of the controller to set, as in contactor type controllers, any desired signal to values desired by the user for any desired period of time. For instance, a switch which is in actuality closed in the process is to be treated by the controller as if it were open, or a valve that would be opened by the controller is to remain closed for a definite period of time.

SUMMARY OF THE INVENTION

Accordingly, it is an object of the present invention to develop a memory-programmable controller of the type mentioned above such that input and output signals from and to the controlled process and other signals which can be handled bit-wise in any desired manner can be set at defined values. It is a further object to provide such a controller at low cost and one which has a short reaction time.

These and other objects of the present invention are achieved in a memory-programmable controller of the type having a cyclically traversed user control program having a plurality of control commands for controlling a peripheral process including a processor for processing control commands from the control program and operating system commands from an operating system program, a user program memory wherein the control program including the control commands is stored, an operating system memory wherein the operating system program including the operating system commands is stored and a data memory, each of the memories coupled to the processor, image signals of the process being stored in the data memory in the form of data one bit wide, the image signals being transferred between the peripheral process and the data memory and being processed under control of the control program, wherein the improvement comprises a supplemental memory coupled in parallel with the data memory, each of the data and supplemental memory having a plurality of addresses and being bit addressable and containing data one bit wide at each address, a supplemental bit being stored at each address of the supplemental memory, each supplemental bit being associated with corresponding ones of the bit wide data stored in the data memory, the state of the supplemental bit determining whether the bit wide data in the data memory can be changed in a transfer between the peripheral process and the data memory and during processing of the image signals under control of the control program.

To each bit in the process image and therefore to each process signal is thus assigned a bit in the supplemental memory, which indicates whether the corresponding signal in the process image should be treated as fixed or not. If a bit of the process image is characterized in the supplemental memory as fixed (forced), the bit of the process image and the corresponding peripheral signal must not be changed by the control program or during the process image transfer.

BRIEF DESCRIPTION OF THE DRAWINGS

The invention will be explained in further detail with reference to the drawings, in which:

FIG. 1 is a block diagram of one embodiment of the memory-programmable controller;

DETAILED DESCRIPTION

Figure 3:
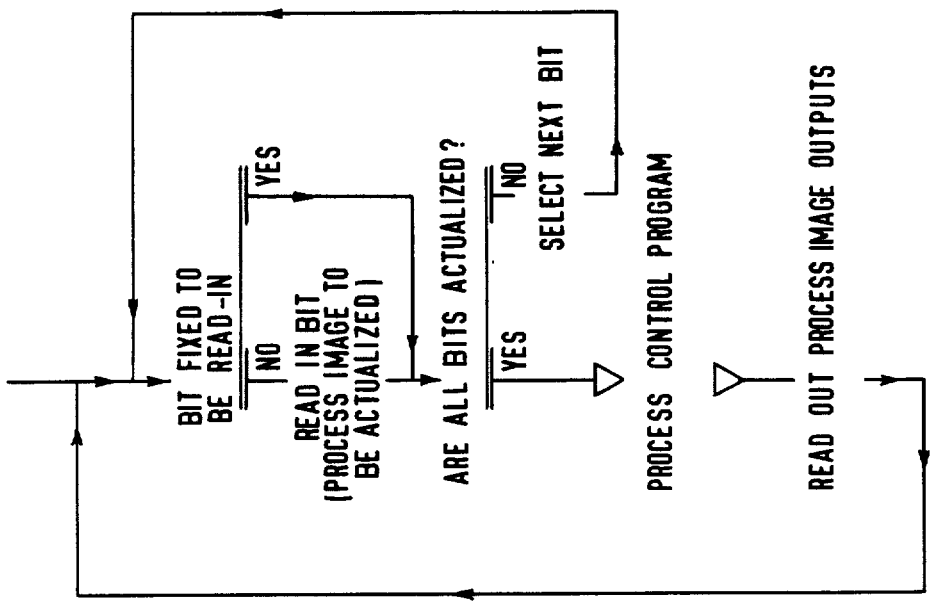
FIG. 3 is a flow diagram illustrating how supplemental bits are processed.

With reference now to the drawings, FIG. 1 shows a memory-programmable controller of the multiprocessor type wherein the execution of binary commands is assigned to a separate fast bit processor 3, while a relatively slow word processor 2 carries out more complex functions. The word processor 2 is coupled to a peripheral bus 21, to which the input and output modules 1 from and to the process to be controlled are connected. Further, an internal system bus 22 may be connected to operating system memory 4 and, via data switches 8, to user program memory 5, in which the control program is stored, and data memory 6 wherein the process image is stored. The bit processor 3 is also connected to bus 22. The bit processor has access to user memory 5 and data memory 6 exclusively by way of dedicated buses 31 and 32 and the data switches 8. The data flow with the peripheral process always takes place via the word processor 2 which stores at the control program cycle limits the status of all input information from the process in the internal data memory 6 and transmits the output signals resulting from the interlinkages in the data memory 6 at the end of the control program to the peripheral process. While the program is running, the controller therefore does not operate directly with the actual signals of the controlled peripheral process, but rather with the internal process image in the data memory 6. In principle, such a system is known from the above-mentioned literature references, and also from Siemens Energietechnik, 1980, No. 9, page 361, with respect to the use of the word and bit processor.

As evident from the drawings, a supplemental memory 7, in which supplemental bits (also called change bits herein) can be stored and from which the change bits can be interrogated together with the bit-wide data in the data memory, is provided parallel to the bit-addressable data memory, the bit-wide data of which are the basis of the control processing.

The desired bit-wide data in the data memory 6 are first fixed by operating commands of the user to the controller. These commands indicate which bits are to be fixed in the process image and at which state the information is to be frozen (zero or one). Such a command causes the bit corresponding to the signal or bit in the process image to be fixed, to be set in the supplemental memory 7. The supplemental memory 7 can physically form part of the data memory 6. The respective bit in the data memory 6 is then characterized as fixed by the command. In addition, the information about whether the bit in the data memory 6 is fixed to zero or one is transferred directly into the process image, i.e., into the data memory 6. This information can no longer be changed except by revoking the command, i.e., by resetting the corresponding change bit in the supplemental memory 7.

The process image in the data memory 6 can be changed by reading in the input signals from the process as well as by the control program. When the word processor 2 reads-in input signals, only those bits in the process image in the data memory 6 are actualized or stored which are characterized as not fixed. The processor 2 therefore reads first in the memory 7 whether the bit to be actualized is fixed or not. If the bit is fixed, nothing further is done; if the bit is not fixed, the corresponding peripheral process signal must be transferred into the process image as a binary signal.

Changing fixed bits of the process image by the control program itself is prevented by suppression of the write signal to the data memory 6 in the case of assignment to fixed output signals, intermediate flags, etc. Thus, write accesses, i.e., assignments to all data that can be handled by bits such as flags, outputs, etc. (see FIG. 2), are executed only if the respective bit is characterized as not fixed by the supplemental memory 7.

Figure 2:
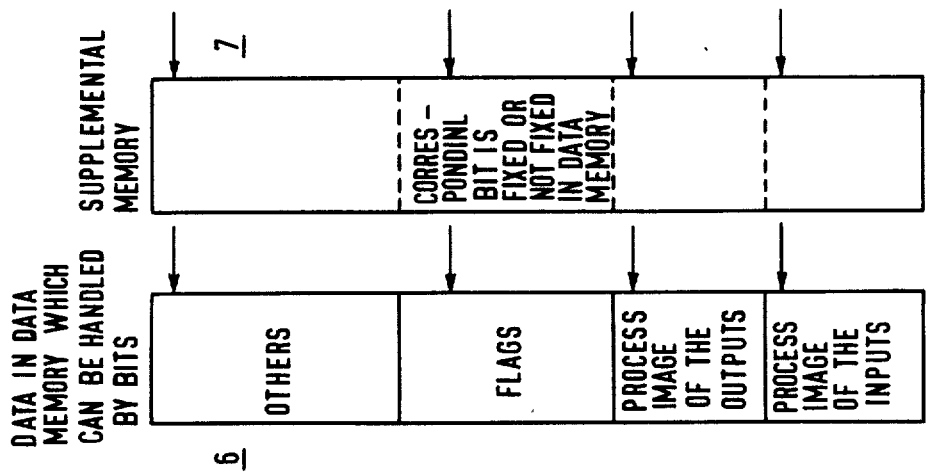
FIG. 2 is a block diagram showing the parallel relationship of the data memory and the supplemental memory.

Since the values can be accessed by the processor 2 or the processor 3 without limitation from the process image in the data memory 6 even if the signals are fixed, all fixed data can also be interlinked further with other data in the process image. By setting a bit in the supplemental memory 7, the corresponding bit in the process image is therefore permanently written-in or forced to assume the fixed value for as long as the supplemental bit is set. The additional cost consists merely of additional memory requirements analogous to the size of the process image or the data to be fixed which can be handled by bits, as shown in FIG. 2. The user of a conventional contactor type controller therefore does not have to give up the possibility of fixing process signal states when he converts to a microprocessor based controller.

The functional sequence discussed above which is obtained when reading-in and reading-out the process image to the peripheral controlled process and in processing the control program is summarized in the flow diagram shown in FIG. 3.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. In a memory-programmable controller of the type having a cyclically traversed user control program having a plurality of control commands for controlling a peripheral process including a processor for processing control commands from the control program and operating system commands from an operating system program, a user program memory wherein the control program including the operating system commands is stored and a data memory, each of said memories coupled to the processor, image signals comprising input and output signals of the process being stored in the data memory in the form of data one bit wide, the image signals being transferred between the peripheral process and the data memory and being processed under control of the control program, the improvement comprising:

a supplemental memory coupled in parallel with the data memory, each of said data and supplemental memory having a plurality of addresses and being bit addressable and containing data one bit wide at each address, a supplemental bit being stored at each address of said supplemental memory, each supplemental bit being associated with corresponding ones of the bit wide data stored in the data memory, the state of the supplemental bit determining whether the bit wide data in the data memory can be changed or is to remain unchanged in a transfer of the image signals between the peripheral process and the data memory and during processing of the image signals under control of the control program.

* * * * *